United States Patent
Yamaguchi et al.

(10) Patent No.: US 7,286,119 B2
(45) Date of Patent: Oct. 23, 2007

(54) THREE-DIMENSIONAL OBJECT MANIPULATING APPARATUS, METHOD AND COMPUTER PROGRAM

(75) Inventors: Kosuke Yamaguchi, Kanagawa (JP); Ken Miyashita, Kanagawa (JP)

(73) Assignee: Sony Corporation, Tokyo (JP)

(*) Notice: Subject to any disclaimer, the term of this patent is extended or adjusted under 35 U.S.C. 154(b) by 653 days.

(21) Appl. No.: 10/785,457

(22) Filed: Feb. 24, 2004

(65) Prior Publication Data
US 2004/0164957 A1 Aug. 26, 2004

(30) Foreign Application Priority Data
Feb. 26, 2003 (JP) ............................ P2003-050059

(51) Int. Cl.
*G09G 5/00* (2006.01)
(52) U.S. Cl. ........................ 345/184; 345/156; 345/419
(58) Field of Classification Search ................ 345/156, 345/157, 419, 619, 653, 184; 715/848, 850, 715/861, 856
See application file for complete search history.

(56) References Cited

U.S. PATENT DOCUMENTS 5,583,977 A * 12/1996 Seidl ........................ 345/619
6,297,795 B1 * 10/2001 Kato et al. .................. 345/684

FOREIGN PATENT DOCUMENTS

| JP | 05-108263 | 4/1993 |
|---|---|---|
| JP | 08-161098 | 6/1996 |
| JP | 10-240693 | 9/1998 |
| JP | 2002-288690 | 10/2002 |

* cited by examiner

*Primary Examiner*—Kevin M. Nguyen
(74) *Attorney, Agent, or Firm*—Finnegan, Henderson, Farabow, Garrett & Dunner, L.L.P.

(57) ABSTRACT

A three-dimensional object manipulating technique is provided. An axis of rotation is set for a three-dimensional object (40) on the basis of a push-in of a dial (8) of a dial-operated input device (7), and the three-dimensional object (40) is rotated through a user-defined angle about the set axis of rotation on the basis of a direction and angle of rotation of the dial (8) of the dial-operated input device (7). Also, an axis of movement is arbitrarily set for the three-dimensional object (40) on the basis of a push-in of the dial (8) of the dial-operated input device (7) and moved over a user-defined distance along the set axis of movement on the basis of a direction and angle of rotation of the dial (8) of the dial-operated input device (7). Further, the three-dimensional object (40) is resized at a user-defined scale-up or -down rate on the basis of a direction and angle of rotation of the dial (8) of the dial-operated input device (7). The present invention thus permits the user to make an manipulation, that is, rotation, movement, scale up or down, of the three-dimensional object (40) being displayed with the use of the dial-operated input device (7).

15 Claims, 10 Drawing Sheets

THREE-DIMENSIONAL OBJECT MANIPULATING APPARATUS, METHOD AND COMPUTER PROGRAM

BACKGROUND OF THE INVENTION

1. Field of the Invention

The present invention relates to an apparatus, method and computer program, for rotating, moving, scaling up or down or otherwise manipulating a three-dimensional object on a display screen by a dial-operated input device.

This application claims the priority of the Japanese Patent Application No. 2003-050059 filed on Feb. 26, 2003, the entirety of which is incorporated by reference herein.

2. Description of the Related Art

Generally, a pointing device such as a mouse or the like is used to rotate, move, scale up or down or otherwise manipulate a three-dimensional object displayed on a display screen. With the pointing device like the mouse, the user can intuitively make a pointing operation with a high degree of freedom because a movement of the user's hand or finger precisely results in a movement of a pointing cursor on the display screen.

Also, there are well known a mouse having additionally provided on the body thereof a dial which supplies another scale factor at which an image is to be displayed on a display screen (as disclosed in the Japanese Published Unexamined Patent Application No. 1993-108263, FIG. 1, for example) and a mouse having additionally provided on the body thereof a rotation unit whose operation is combinable with operations of the mouse itself to provide various events (as disclosed in the Japanese Published Unexamined Patent Application No. 1996-161098, FIG. 2, for example), etc.

However, the pointing device such as a mouse can only be used smoothly and comfortably in an ample operating space. There will arise no problem with a pointing device which is used with an apparatus to which a variety of peripheral devices is to be connected, such as a personal computer or the like. But the pointing device is not suitable for use with a portable information device such as a mobile phone or PDA (portable digital assistant) as well as with a portable electronic appliance such as digital video camcorder (=camera/recorder) or the like.

Many of recent portable electronic appliances such as the portable phone, PDA, digital video camcorder, etc. have installed therein a dial-operated input device with a jog dial as an input device to enable the user to select an object such as an icon or the like in a menu screen. The dial of the dial-operated input device can be pushed in and freely rotated. When the user pushed in and rotates the dial with the finger being applied to the perimeter of the dial, for example, the dial-operated input device generates input signals corresponding to a direction and angle of the dial rotation. Since the dial-operated input device can simply be constructed, it can easily be incorporated in a display unit, electronic appliance body or the like and it needs only a small operating space. Namely, the input device of this type can be said to be suitable for use with the above-mentioned portable electronic appliance.

On the other hand, however, since the dial-operated input device is inferior in degree of freedom of pointing operation to the mouse, it is not suitable for defining an arbitrary axis of rotation of a three-dimensional object, rotating the three-dimensional object about the axis of rotation and moving the three-dimensional object in an arbitrary direction.

OBJECT AND SUMMARY OF THE INVENTION

It is therefore an object of the present invention to overcome the above-mentioned drawbacks of the related art by providing an apparatus, method and computer program, capable of defining an arbitrary axis of rotation for a three-dimensional object being displayed on a display screen and rotating the three-dimensional object about the axis of rotation by operating a dial-operated input device.

The present invention has another object to provide an apparatus, method and computer program, capable of defining an arbitrary axis of movement for a three-dimensional object being displayed on a display screen and moving the three-dimensional object along the axis of movement by operating a dial-operated input device.

The present invention has still another object to provide an apparatus, method and computer program, capable of scaling up or down a three-dimensional object being displayed on a display screen by operating a dial-operated input device.

The present invention has yet another object to provide an apparatus, method and computer program, capable of defining an arbitrary axis of rotation for a three-dimensional object being displayed on a display screen and rotating the three-dimensional object at an arbitrary speed by operating a dial-operated input device.

The present invention has still yet another object to provide an apparatus, method and computer program, capable of defining an arbitrary axis of movement for a three-dimensional object being displayed on a display screen and moving the three-dimensional object at an arbitrary speed by operating a dial-operated input device.

The present invention has also another object to provide an apparatus, method and computer program, capable of scaling up or down a three-dimensional object being displayed on a display screen at an arbitrary scale-varying rate by operating a dial-operated input device.

The above object can be attained by providing a three-dimensional object manipulating apparatus including, according to the present invention:

a display means for displaying a three-dimensional object on the screen of a display unit;

a rotation-axis setting means for setting an axis of rotation for the three-dimensional object on the basis of a push-in made of a dial, which can be pushed in and rotated, of a dial-operated input device;

a detection means for detecting the direction and angle of a rotation made of the dial of the dial-operated input device; and an object rotating means for rotating the three-dimensional object being displayed on the screen of the display unit about the axis of rotation set by the rotation-axis setting means on the basis of the direction and angle of rotation, detected by the detection means, of the dial of the dial-operated input device.

With the above three-dimensional object manipulating apparatus, the user can arbitrarily set an axis of rotation for a three-dimensional object by pushing in the dial of the dial-operated input device and rotate the three-dimensional object being displayed on the screen of the display unit through an arbitrary angle about the arbitrary axis of rotation on the basis of a direction and angle of rotation of the dial of the dial-operated input device.

Also, the above object can be attained by providing a three-dimensional object manipulating apparatus including, according to the present invention:

a display means for displaying a three-dimensional object on the screen of a display unit;

a moving-axis setting means for setting an axis of movement for the three-dimensional object on the basis of a push-in made of a dial, which can be pushed in and rotated, of a dial-operated input device;

a detection means for detecting the direction and angle of a rotation made of the dial of the dial-operated input device; and an object moving means for moving the three-dimensional object being displayed on the screen of the display unit along the axis of movement set by the moving-axis setting means on the basis of the direction and angle of rotation, detected by the detection means, of the dial of the dial-operated input device.

With the above three-dimensional object manipulating apparatus, the user can arbitrarily set an axis of movement for a three-dimensional object by pushing in the dial of the dial-operated input device and move the three-dimensional object being displayed on the screen of the display unit over an arbitrary distance along the arbitrary axis of movement on the basis of a direction and angle of rotation of the dial of the dial-operated input device.

The above object can be attained by providing a three-dimensional object manipulating apparatus including, according to the present invention:

a display means for displaying a three-dimensional object on the screen of a display unit;

a detection means for detecting the direction and angle of a rotation made of a dial of a dial-operated input device; and an object scale-up/-down means for scaling up or down the three-dimensional object being displayed on the screen of the display unit on the basis of the direction and angle of rotation, detected by the detection means, of the dial of the dial-operated input device.

With the above three-dimensional object manipulating apparatus, the user can resize a three-dimensional object being displayed on the screen of the display unit at an arbitrary scale-up or -down rate on the basis of the direction and angle of rotation of the dial of the dial-operated input device.

According to another aspect of the above three-dimensional object manipulating apparatus, the detection means further has a function of detecting a speed at which the dial of the dial-operated input device has been rotated, and the object rotating means rotates the three-dimensional object at a speed corresponding to the speed of rotation, detected by the detection means, of the dial-operated input device.

With the above three-dimensional object manipulating apparatus, the user can rotate a three-dimensional object being displayed on the screen of the display unit at an arbitrary speed on the basis of the speed of rotation of the dial of the dial-operated input device.

According to still another aspect of the above three-dimensional object manipulating apparatus, the detection means further has a function of detecting a speed at which the dial of the dial-operated input device has been rotated, and the object moving means moves the three-dimensional object at a speed corresponding to the speed of rotation, detected by the detection means, of the dial-operated input device.

With the above three-dimensional object manipulating apparatus, the user can move a three-dimensional object being displayed on the screen of the display unit at an arbitrary speed on the basis of the speed of rotation of the dial of the dial-operated input device.

According to yet another aspect of the above three-dimensional object manipulating apparatus, the detection means further has a function of detecting a speed at which the dial of the dial-operated input device has been rotated ,and the object scale-up/-down means scales up or down the three-dimensional object being displayed on the screen of the display unit at a scale-varying rate corresponding to the speed of rotation, detected by the detection means, of the dial-operated input device.

With the above three-dimensional object manipulating apparatus, the user can scale up or down a three-dimensional object being displayed on the screen of the display unit at an arbitrary scale-varying rate on the basis of the speed of rotation of the dial of the dial-operated input device.

Also, the above object can be attained by providing a three-dimensional object manipulating method in which there are used a display unit, data processor and a dial-controller input device having a dial which can be pushed in and rotated, the method including, according to the present invention, the steps of displaying, under control of the data processor, a three-dimensional object on the screen of the display unit;

setting, under control of the data processor, an axis of rotation for the three-dimensional object on the basis of a push-in made of the dial of the dial-operated input device, and then detecting the direction and angle of a rotation made of the dial of the dial-operated input device; and rotating, under control of the data processor, the three-dimensional object about the set axis of rotation on the basis of the detected direction and angle of the rotation of the dial of the dial-operated input device.

By the above three-dimensional object manipulating method, the user can arbitrarily set an axis of rotation for a three-dimensional object by pushing in the dial of the dial-operated input device, and rotate the three-dimensional object being displayed on the screen of the display unit through an arbitrary angle about an arbitrary axis of rotation on the basis of the direction and angle of rotation of the dial of the dial-operated input device.

Also, the above object can be attained by providing a three-dimensional object manipulating method in which there are used a display unit, data processor and a dial-operated input device having a dial which can be pushed in and rotated, the method including, according to the present invention, the steps of:

displaying, under control of the data processor, a three-dimensional object on the screen of the display unit;

setting, under control of the data processor, an axis of movement for the three-dimensional object on the basis of a push-in made of the dial of the dial-operated input device, and then detecting the direction and angle of a rotation made of the dial of the dial-operated input device; and moving, under control of the data processor, the three-dimensional object along the set axis of movement on the basis of the detected direction and angle of the rotation of the dial of the dial-operated input device.

By the above three-dimensional object manipulating method, the user can arbitrarily set an axis of movement for a three-dimensional object by pushing in the dial of the dial-operated input device, and move the three-dimensional object being displayed on the screen of the display unit over an arbitrary distance along the arbitrary axis of movement on the basis of the direction and angle of rotation of the dial of the dial-operated input device.

Also, the above object can be attained by providing a three-dimensional object manipulating method in which there are used a display unit, data processor and a dial-operated input device having a dial which can be pushed in and rotated, the method including, according to the present invention, the steps of:

displaying, under control of the data processor, a three-dimensional object on the screen of the display unit;

detecting, under control of the data processor, the direction and angle of a rotation made of the dial of the dial-operated input device; and scaling up or down the three-dimensional object being displayed on the screen of the display unit on the basis of the detected direction and angle of the rotation of the dial of the dial-operated input device.

By the above three-dimensional object manipulating method, the user can resize a three-dimensional object being displayed on the screen of the display unit at an arbitrary scale-up or -down rate on the basis of the direction and angle of rotation of the dial of the dial-operated input device.

According to another aspect of the above three-dimensional object manipulating method, the data processor detects a speed at which the dial of the dial-operated input device has been rotated, and rotates the three-dimensional object at a speed corresponding to the speed of the rotation of rotation of the dial-operated input device.

By the above three-dimensional object manipulating method, the user can rotate a three-dimensional object being displayed on the screen of the display unit at an arbitrary speed on the basis of the direction and angle of rotation of the dial of the dial-operated input device.

According to still another aspect of the above three-dimensional object manipulating method, the data processor detects a speed at which the dial of the dial-operated input device has been rotated, and moves the three-dimensional object being displayed on the screen of the display unit at a speed corresponding to the detected speed of rotation of the dial of the dial-operated input device.

By the above three-dimensional object manipulating method, the user can move a three-dimensional object being displayed on the screen of the display unit at an arbitrary speed on the basis of the direction and angle of rotation of the dial of the dial-operated input device.

According to yet another aspect of the above three-dimensional object manipulating method, the data processing detects a speed at which the dial of the dial-operated input device has been rotated, and scales up or down the three-dimensional object being displayed on the screen of the display unit at a scale-varying rate corresponding to the speed of rotation of the dial of the dial-operated input device.

By the above three-dimensional object manipulating method, the user can scale up or down a three-dimensional object being displayed on the screen of the display unit at an arbitrary scale-varying rate on the basis of the speed of or rotation the dial of the dial-operated input device.

Also, the above object can be attained by providing a computer program allowing, according to the present invention, a computer to function as:

a display means for displaying a three-dimensional object on the screen of a display unit;

a rotation-axis setting means for setting an axis of rotation for the three-dimensional object on the basis of a push-in made of a dial, which can be pushed in and rotated, of a dial-operated input device;

a detection means for detecting the direction and angle of a rotation made of the dial of the dial-operated input device; and an object rotating means for rotating the three-dimensional object being displayed on the screen of the display unit about the axis of rotation set by the rotation-axis setting means on the basis of the direction and angle of rotation, detected by the detection means, of the dial of the dial-operated input device.

The above computer program permits the user to arbitrarily set an axis of rotation for a three-dimensional object by pushing in the dial of the dial-operated input device and rotate the three-dimensional object being displayed on the screen of the display unit through an arbitrary angle about the arbitrary axis of rotation on the basis of a direction and angle of rotation of the dial of the dial-operated input device.

Also, the above object can be attained by providing a computer program allowing, according to the present invention, a computer to function as:

a display means for displaying a three-dimensional object on the screen of a display unit;

a moving-axis setting means for setting an axis of movement for the three-dimensional object on the basis of a push-in made of a dial, which can be pushed in and rotated, of a dial-operated input device;

a detection means for detecting the direction and angle of a rotation made of the dial of the dial-operated input device; and an object moving means for moving the three-dimensional object being displayed on the screen of the display unit along the axis of movement set by the moving-axis setting means on the basis of the direction and angle of rotation, detected by the detection means, of the dial of the dial-operated input device.

The above computer program permits the user to arbitrarily set an axis of movement for a three-dimensional object by pushing in the dial of the dial-operated input device and move the three-dimensional object being displayed on the screen of the display unit over an arbitrary distance along the arbitrary axis of movement on the basis of a direction and angle of rotation of the dial of the dial-operated input device.

The above object can be attained by providing a computer program allowing, according to the present invention, a computer to function as:

a display means for displaying a three-dimensional object on the screen of a display unit;

a detection means for detecting the direction and angle of a rotation made of a dial of a dial-operated input device; and an object scale-up/-down means for scaling up or down the three-dimensional object being displayed on the screen of the display unit on the basis of the direction and angle or rotation, detected by the detection means, of the dial of the dial-operated input device.

The above three-dimensional object manipulating apparatus permits the user to resize a three-dimensional object being displayed on the screen of the display unit at an arbitrary scale-up or -down rate on the basis of the direction and angle of rotation of the dial of the dial-operated input device.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning the embodiments thereof with reference to the accompanying drawings.

Figure 1:
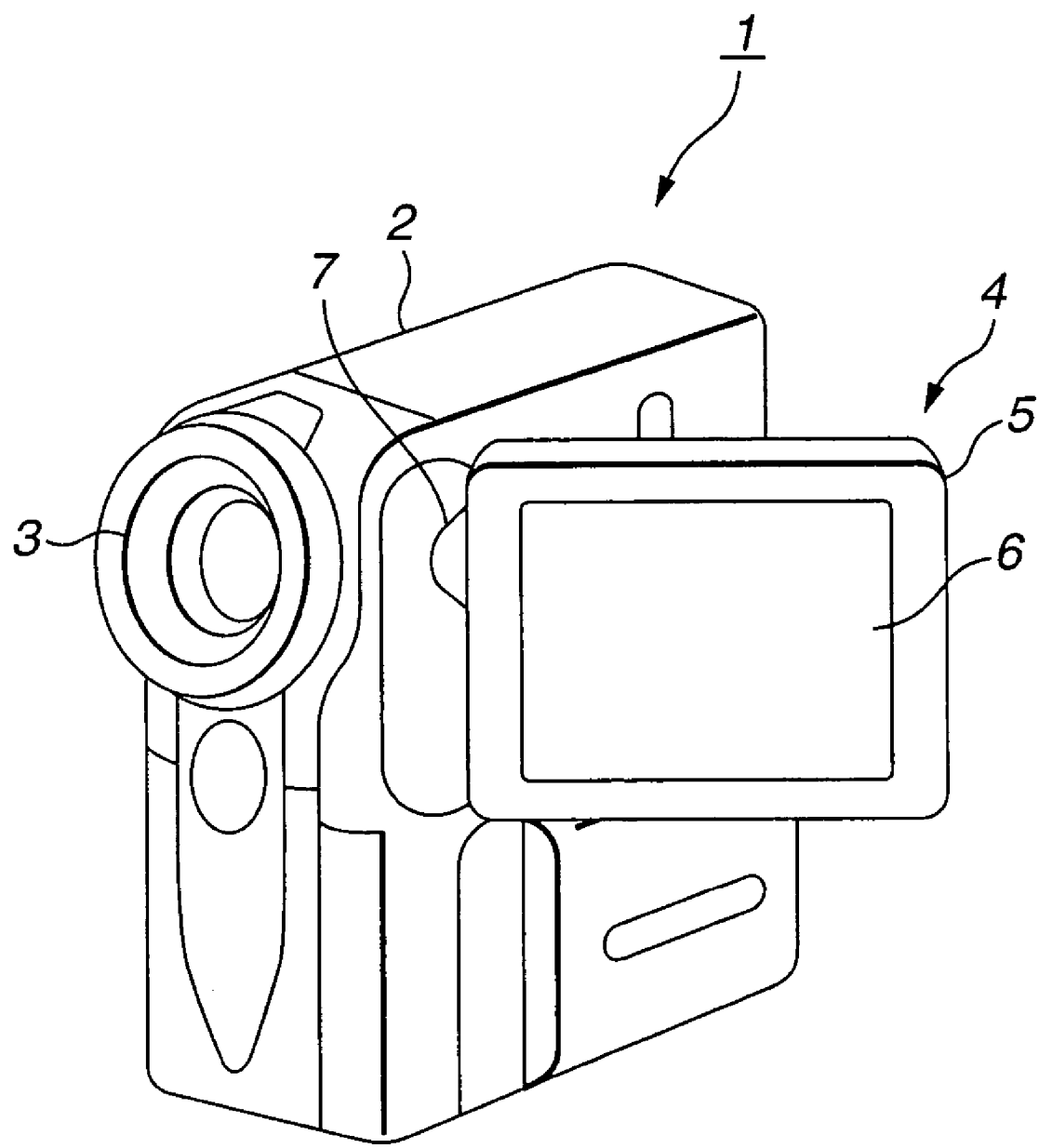
FIG. 1 is a perspective view of a digital video camcorder as a first embodiment of the electronic appliance according to the present invention.

Referring now to FIG. 1, there is schematically illustrated in the form of a perspective view the digital video camcorder as the first embodiment of the electronic appliance to which the present invention is applied.

The digital video camcorder, generally indicated with a reference number 1, includes a body 2 having an appropriate shape and size for the user to operate the digital video camcorder 1 while holding the latter in one hand. The body 2 is provided with a lens unit 3, a display unit 4 with a dial, etc. On the screen of the display unit 4 with the dial, there are to be displayed an image of a captured object, an image read from a storage medium set in the digital video camcorder 1, an icon menu for allowing the user to select a function to be performed by the digital video camcorder 1, etc.

Figure 2:
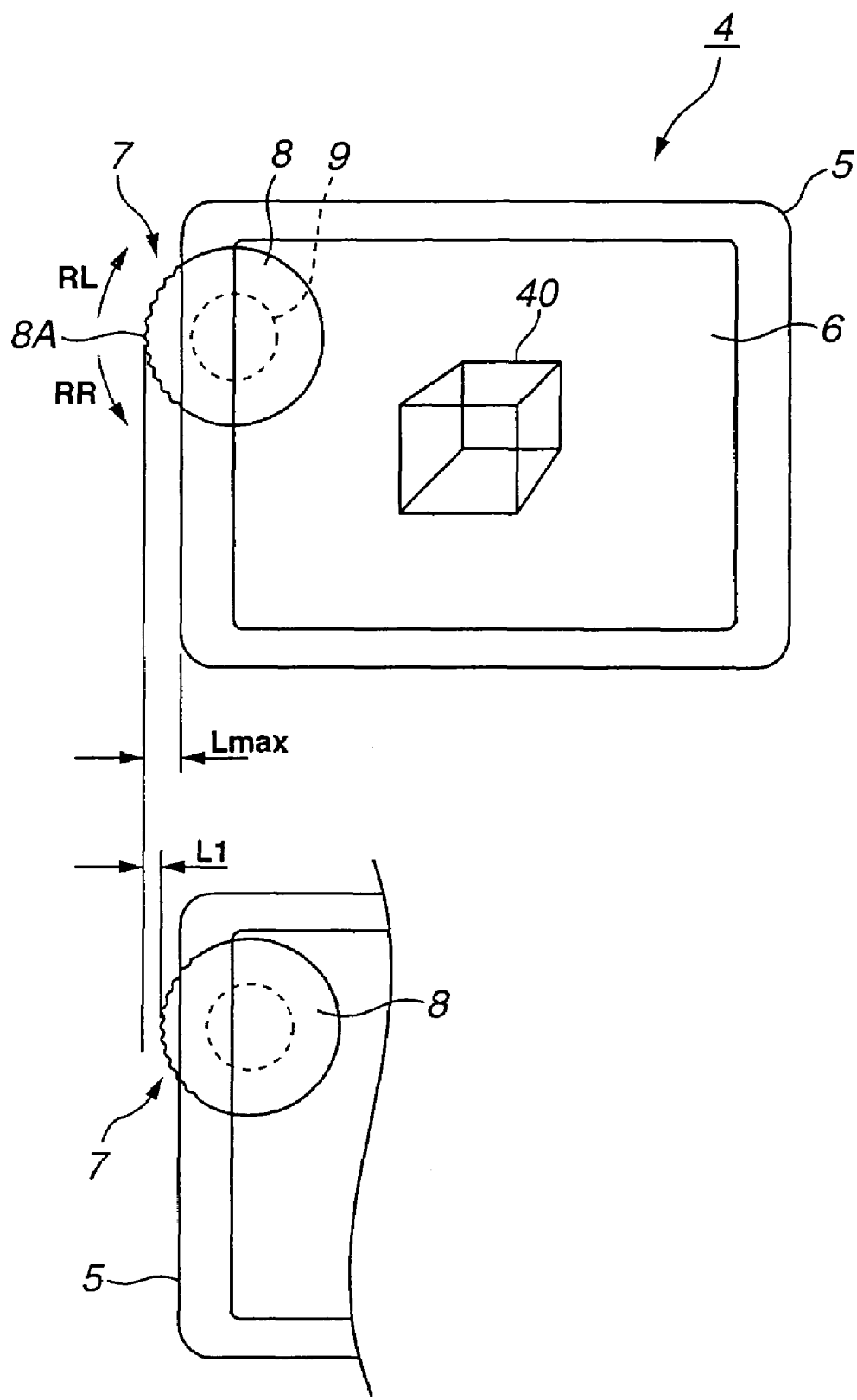
FIG. 2 is a plan view of a display unit, provided with a dial, of the digital video camcorder in FIG. 1.

FIG. 2 is a detailed plan view of the display unit 4 of the digital video camcorder 1 in FIG. 1, provided with a dial. The display unit 4 with the dial includes a rectangular casing 5 having disposed on one side thereof the screen of a display device 6 such as an LCD (liquid crystal display) panel, for example. Also, the display unit 4 has provided at the rectangular casing 5 thereof a dial-operated input device 7 having a dial, which can be pushed in and rotated, like a jog dial, by the user for entry of various commands for various three-dimensional objects displayed on the screen of the display device 6.

The dial-operated input device 7 is composed mainly of a freely-rotatable circular dial 8 knurled (indicated with a reference number 8A) on the perimeter thereof and a signal generator (rotary encoder) 9 which detects the direction and angle of a rotation made of the dial 8 and generates corresponding electrical signals. The dial 8 has a part thereof projected from the side of the rectangular casing 5. More specifically, the dial 8 is provided to freely movable between a first position when the part thereof is projected a maximum length (Lmax) from the side of the rectangular casing 5 and a second position where the part is pushed in a constant stroke (L1) to the side of the rectangular casing 5. The dial 8 is held in the first position as a home position under the force of an elastic member such as a spring (not shown). In the first position, the dial 8 is locked against rotation, and when in the second position, it is unlocked for free rotation. That is, while being pushed in to the second position, the dial 8 of the dial-operated input device 7 can be rotated in an arbitrary direction with the finger applied to the perimeter of the dial 8.

Figure 3:
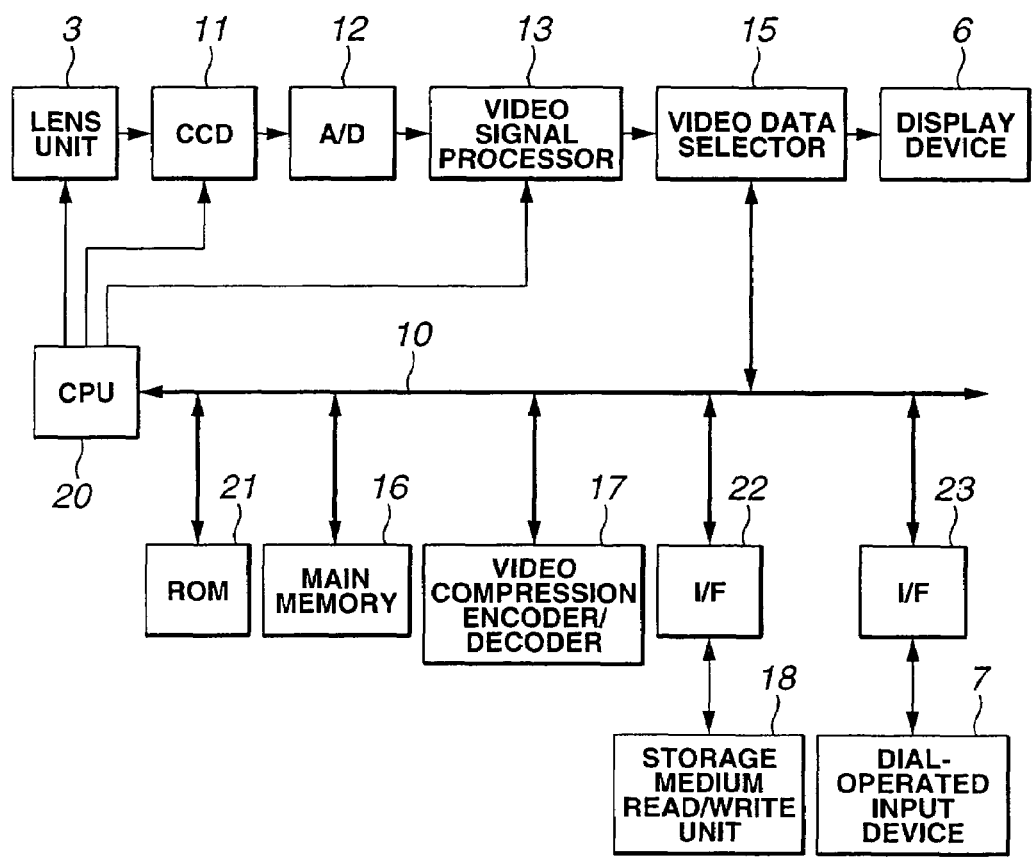
FIG. 3 is a block diagram of the digital video camcorder in FIG. 1, showing the electrical connection in the digital video camcorder.

FIG. 3 is a block diagram of the digital video camcorder 1 in FIG. 1, showing the electrical connection in the digital video camcorder 1. As shown, the lens unit 3 has the aperture or focus thereof automatically controlled by a control signal from a CPU 20. An output signal from a CCD (charge-coupled device) 11 is converted by an A-D (analog-digital) converter 12 into a digital video signal, and then passed to a video signal processor 13. The video signal processor 13 generates RGB signal for each of pixels in the supplied digital video signal, and supplies the RGB signals to the display device 6 via a video data selector 15.

The CPU 20 has connected to a bus 10 thereof a main memory 16, ROM (read-only memory) 21, video compression encoder/decoder 17 and the video data selector 15. The main memory 16 includes a DRAM (dynamic random access memory) or the like and is capable of rapid data read and write. It is used as a working area of the CPU 20, display frame buffer or the like. The ROM 21 is a non-volatile memory having various programs and data fixedly stored therein. The video compression encoder/decoder 17 is a circuit module to compress or expand a static image using JPEG (Joint Photographic Experts Group) and a moving image using MPEG (Moving Picture Experts Group), for example. The video data selector 15 selects a destination to which video data is to be transferred.

To the bus 10, there are further connected a storage medium read/write unit 18 to read and write data from and to a storage medium such as a memory stick, smart medium, magnetic tape, hard disk drive or the like, dial-operated input device 7, etc. via interfaces (I/F) 22 and 23, respectively.

The CPU 20 controls information transfer between the system components via the bus 10, and it loads a necessary program and data from the ROM 21 to the main memory 16 to control the digital video camcorder 1 according to the program and make a variety of data processing.

Next, there will be illustrated and explained a system for displaying a three-dimensional object on the screen of the display device 6 of the digital video camcorder 1 and manipulate the three-dimensional object using the dial-operated input device 7.

Figure 4:
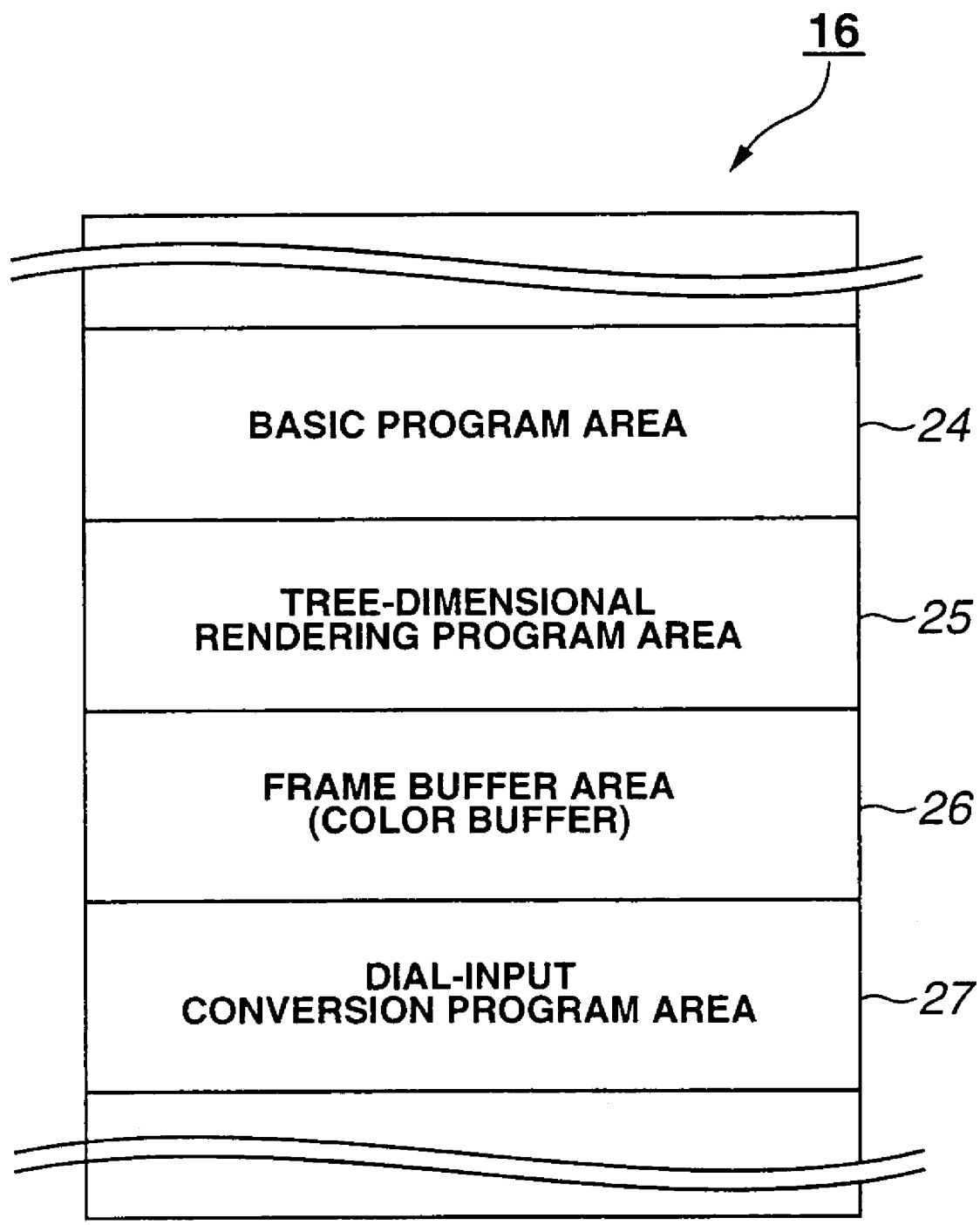
FIG. 4 shows program and data storage areas in a main memory, which are secured when a three-dimensional object is manipulated by a dial-operated input device.

FIG. 4 shows program and data storage areas in the main memory 16, which are secured when the three-dimensional object is manipulated by the dial-operated input device 7.

As shown, the main memory 16 has defined therein at least a basic program area 24, three-dimensional rendering program area 25, frame buffer area 26, dial-input conversion program area 27, etc.

In the basic program area 24, there is stored a basic program for operating the digital video camcorder 1.

The three-dimensional program area 25 is an area for storage of a three-dimensional rendering program for rendering a three-dimensional object as well as for editorial manipulation, such as rotation, movement, scale up or down of the three-dimensional object.

The frame buffer area 26 stores data to be displayed on the screen of the display device 6.

The dial-input conversion program area 27 stores a dial-input conversion program for converting an operation of the dial-operated input device 7 into a command and parameter that can be interpreted by the three-dimensional rendering program. The dial-input conversion program determines a clicking operation, pressing operation, clockwise or counterclockwise rotation, for example, of the dial-operated input device 7 as an event, generates a command and parameter on the basis of the determined event and gives them to the three-dimensional rendering program.

Figure 10:
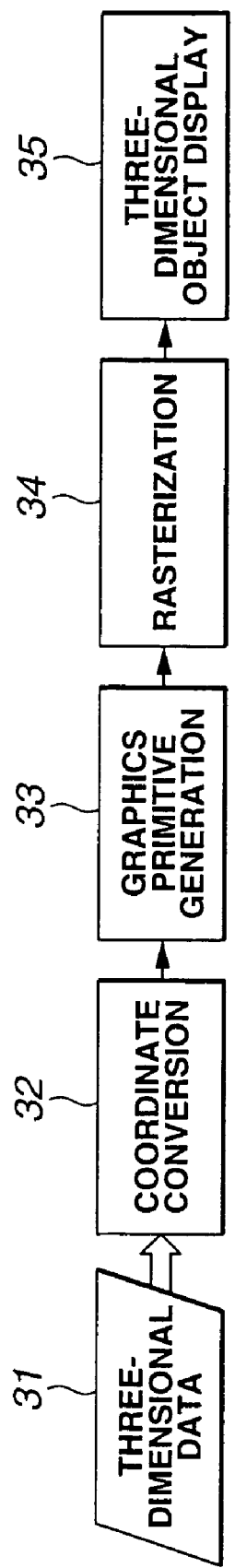
FIG. 10 shows a procedure for rendering a typical three-dimensional model data.

Next, the three-dimensional rendering program will be explained. FIG. 10 shows a procedure for rendering a typical three-dimensional model data according to the three-dimensional rendering program.

According to the three-dimensional rendering program, model data 31 on a three-dimensional object such as an icon, including positions, in a three-dimensional coordinate, of graphics primitives such as a polygon, point, line, plane, etc., attributes of the line and plane, color data, etc. are read from the ROM 21 and three-dimensional coordinates of all points of the three-dimensional object are converted into two-dimensional coordinates (coordinate conversion 32). Next, the three-dimensional object data having been converted into the two-dimensional coordinates are sorted in units of a graphics primitive starting with a one farthest from the point of view to finally leave only viewable points. This is called "hidden surface elimination" (graphics primitive generation 33). Then, a color number of each pixel is written to the frame buffer area (color buffer) on the basis of the three-dimensional object data having undergone the hidden surface elimination (rasterization 34). From a color table in which the relation between RGB value and color number is stored, a relevant RGB value is evoked on the basis of a color number of each pixel stored in the color buffer, and converted into video signal which can be processed in the display unit. The video signal is displayed on the display device 6 (three-dimensional object display 35).

Next, operations made in manipulating the three-dimensional object by the dial-operated input device 7 will be described.

Figure 5:
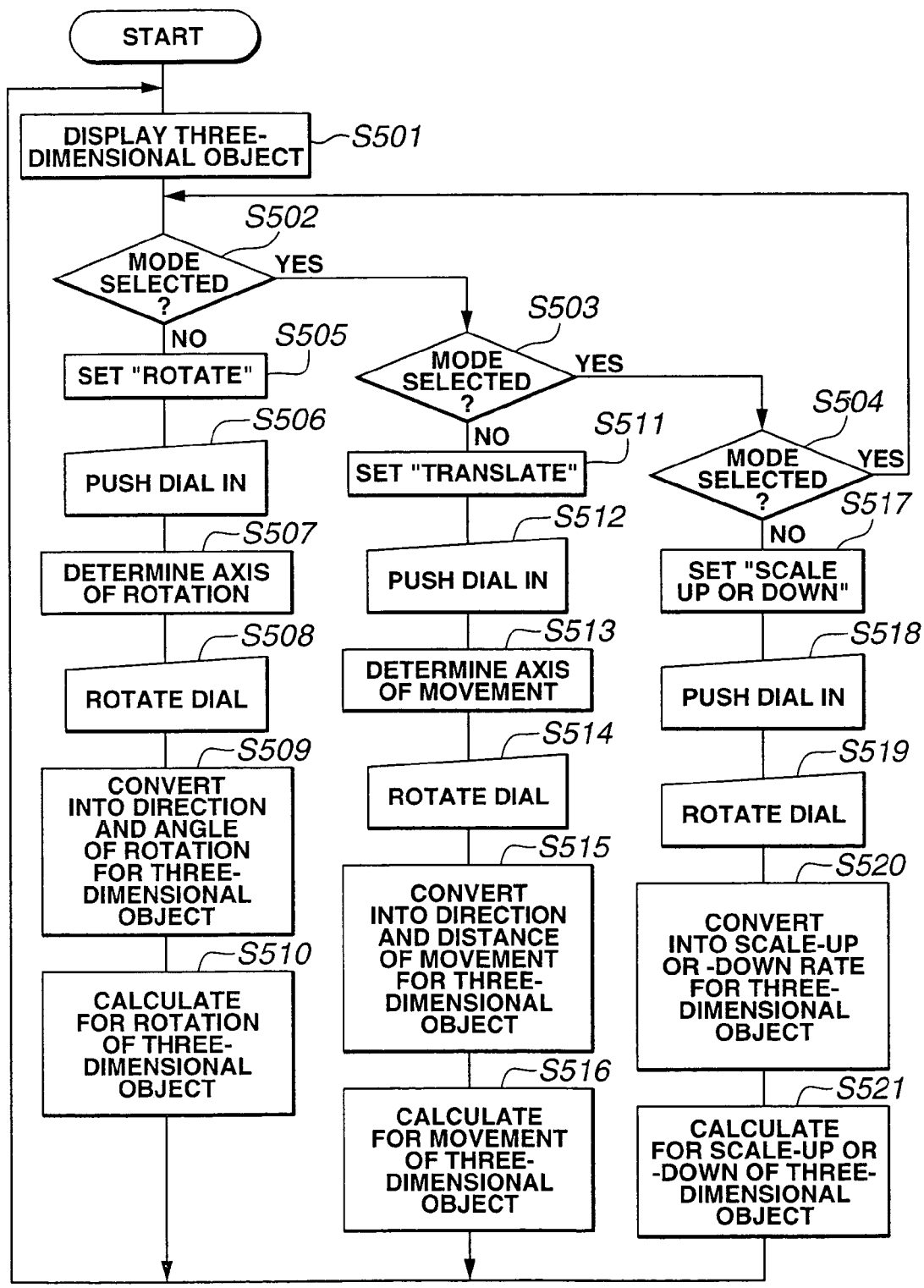
FIG. 5 shows a flow of operations made in manipulating a three-dimensional object by the dial-operated input device.
Figure 6:
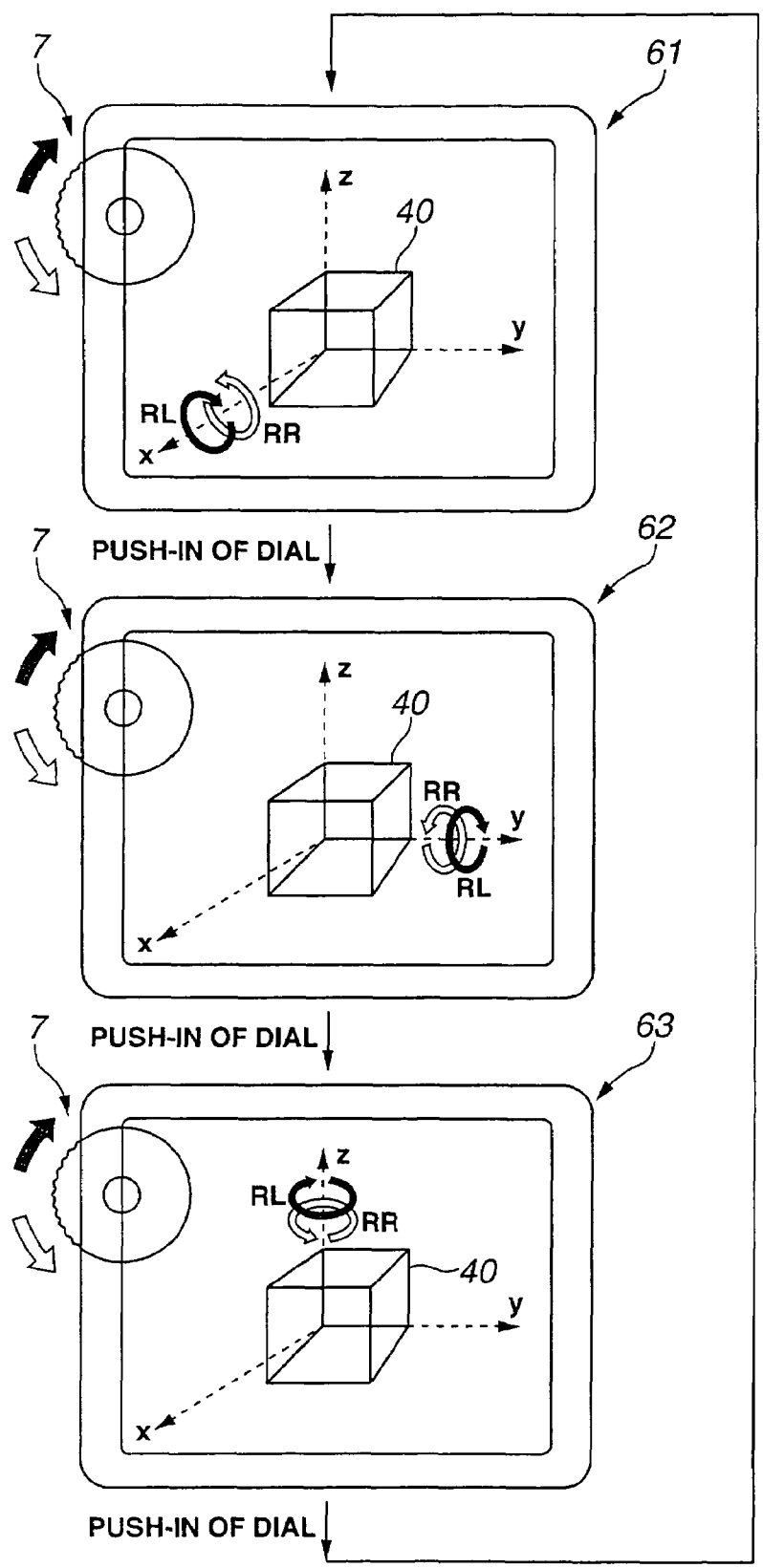
FIG. 6 shows a rotation of a three-dimensional object.
Figure 7:
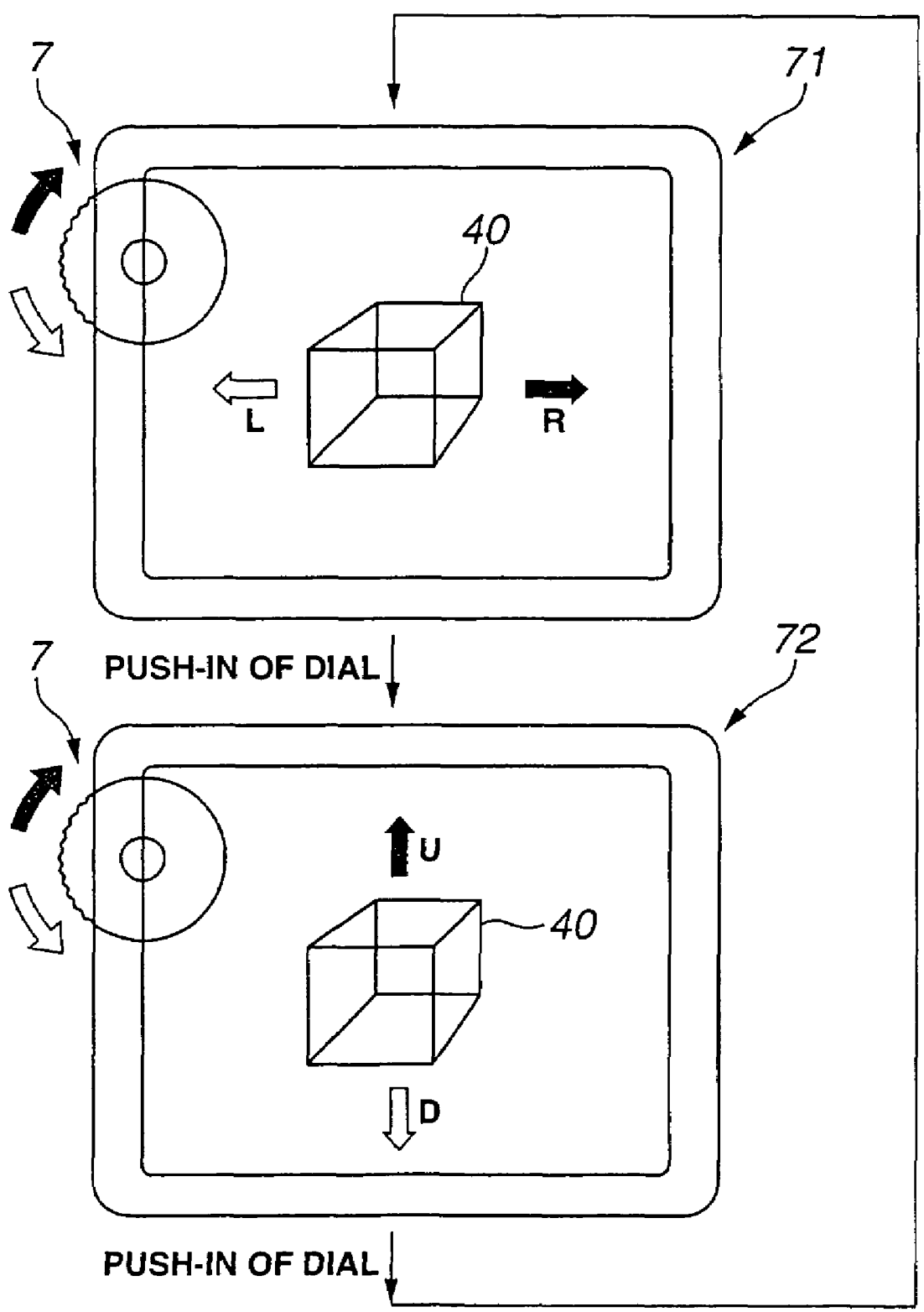
FIG. 7 shows a movement of a three-dimensional object.
Figure 8:
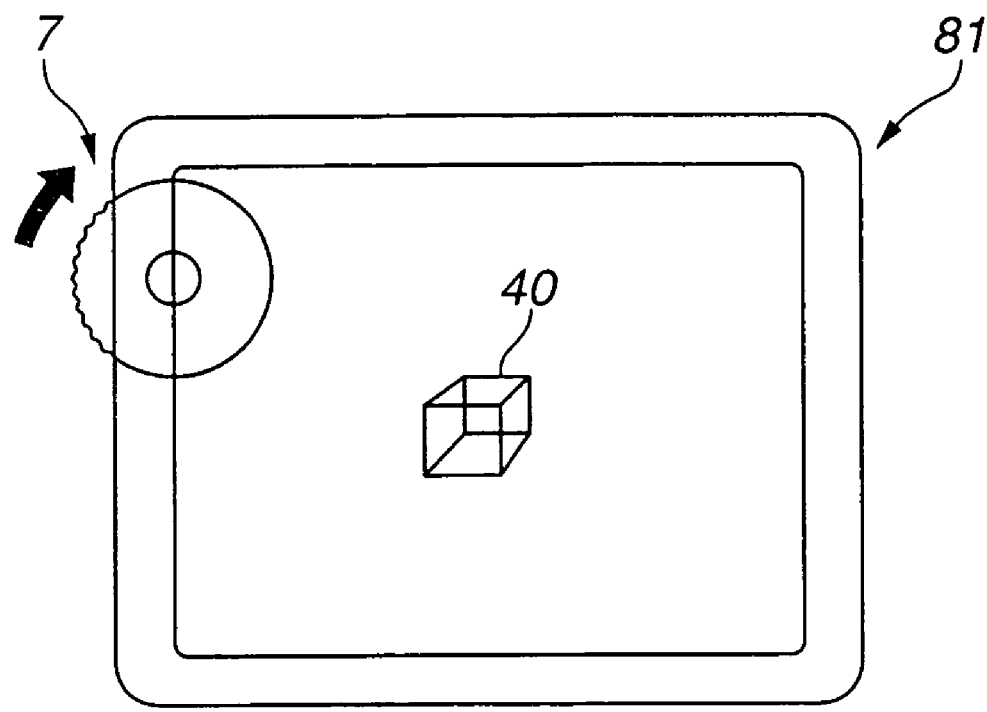
FIG. 8 shows a scale-up and -down of a three-dimensional object.
Figure 8:
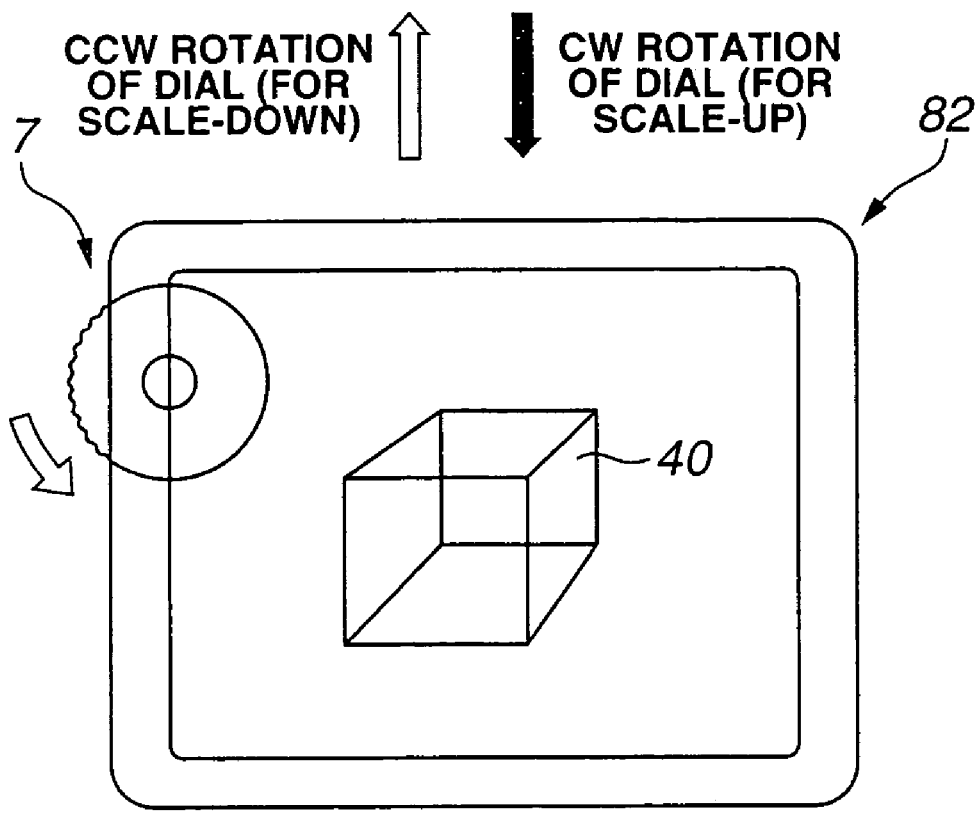

FIG. 5 shows a flow of operations made in manipulating the three-dimensional object by the dial-operated input device 7, FIG. 6 shows a rotation of the three-dimensional object, FIG. 7 shows a movement of the three-dimensional object, and FIG. 8 shows a scale-up or -down of the three-dimensional object.

Now in step S501, a three-dimensional object 40 as shown in FIG. 2 is displayed on the screen of the display device 6. The three-dimensional object 40 has been processed for rendering by the three-dimensional rendering program.

Based on a command and parameter from the dial-input conversion program, the three-dimensional rendering program has rotates, moves, scales up or down the three-dimensional object 40 as will be described below.

First in steps S502 to S504, the three-dimensional rendering program selects a mode of manipulation for the three-dimensional object 40. In response to a manipulation mode select command supplied from the dial-input conversion program, the three-dimensional rendering program selects modes of manipulation in a predetermined sequence. Each time a manipulation mode select command is supplied from the dial-input conversion program, the mode of manipulation is changed in a sequence of "rotate", "move" and "scale-up/-down". When a further manipulation mode select command is supplied while the mode of manipulation is "scale-up/-down", the mode of operation is switched again to "rotate".

The dial-input conversion program determines that the dial 8 of the dial-controlled input device 7 has been pushed in successively twice, which meets a predetermined timing requirement for the dial-operated input device 7, for example, and it gives a manipulation mode select command to the three-dimensional rendering program. The two successive push-in operations made of the dial 8 of the dial-operated input device 7 are equivalent to the "double clicking" well known as an operation of the mouse or the like. However, the operations for mode selection are not limited to such two successive push-in operations. For example, the dial 8 of the dial-operated input device 7 may be any other control, such as a switch provided on the body of the input device 7. Alternatively, in case a touch sensor panel is provided on the screen of the display device 6, the system may be arranged such that buttons for entry of mode select commands are displayed on the display screen, which are to be touched by the user for selection of another mode of manipulation.

Rotation of the three-dimensional object 40

It is assumed here that "rotate" is set as the mode of manipulation of the three-dimensional object 40 in step S505. The dial-input conversion program monitors when the dial 8 of the dial-operated input device 7 has been pushed in or rotated clockwise or counterclockwise. When it is detected in step S506 that the dial 8 of the dial-operated input device 7 has been pushed in once, a command for selection of another axis of rotation for the three-dimensional object 40 is informed to the three-dimensional rendering program.

As shown in FIG. 6, the axis of rotation of the three-dimensional object 40 is one selected by the user from an x-axis, y-axis and z-axis in a three-dimensional space. When the three-dimensional rendering program has accepted the rotation-axis select command from the dial-input conversion program, it will select the axes of rotation for rotation of the three-dimensional object 40 in a predetermined sequence (in the order of the x-axis, y-axis and z-axis, for example). That is, when the initial effective axis of rotation is the x-axis, the y-axis will be determined as a next effective axis of rotation in step S507.

Thereafter, when the user rotates the dial 8 of the dial-operated input device 7 in step S508, the dial-input conversion program converts the detected direction and angle of rotation of the dial 8 of the dial-operated input device 7 into values of direction and angle of rotation, respectively, of the three-dimensional object 40, that can be interpreted by the three-dimensional rendering program, and informs the data to the three-dimensional rendering program in step S509. The three-dimensional rendering program make a calculation for a rotation of the three-dimensional object 40 on the basis of the values of direction and angle of rotation supplied from the dial-input conversion program in step S510. Thus, the three-dimensional object 40 having been rotated as intended by the user is displayed in step S501.

In FIG. 6, a reference number 61 indicates a relation between a direction of rotation of the dial 8 of the dial-operated input device 7 and direction of rotation of the three-dimensional object 40 when the x-axis is selected as the axis of rotation, 62 indicates a relation between a direction of rotation the dial 8 of the dial-operated input device 7 and direction of rotation of the three-dimensional object 40 when the y-axis is selected as the axis of rotation, and 63 indicates a direction of rotation of the dial 8 of the dial-operated input device 7 and direction of rotation of the three-dimensional object 40 when the z-axis is selected as the axis of rotation.

As shown in FIG. 6, when the dial 8 of the dial-operated input device 7 is rotated clockwise with the x-axis being selected as the axis of rotation, the three-dimensional object 40 is rotated through an angle corresponding to the angle of rotation of the dial 8 of the dial-operated input device 7 about the x-axis as the axis of rotation in an RL direction as shown in FIG. 6. On the contrary, when the dial 8 of the dial-operated input device 7 is rotated counterclockwise, the three-dimensional object 40 is rotated through an angle corresponding to the angle of rotation of the dial 8 of the dial-operated input device 7 about the x-axis as the axis of rotation in an RR direction as shown in FIG. 6. Similarly, when the dial 8 of the dial-operated input device 7 is rotated with the y-axis being selected as the axis of rotation, the three-dimensional object 40 is rotated through an angle corresponding to the angle of rotation of the dial 8 of the dial-operated input device 7 about the y-axis as the axis of rotation a direction corresponding to the direction in which the dial 8 of the dial-operated input device 7 has been rotated. When the dial 8 of the dial-operated input device 7 is rotated with the z-axis being selected as the axis of rotation, the three-dimensional object 40 is rotated through an angle corresponding to the angle of rotation of the dial 8 of the dial-operated input device 7 about the z-axis as the axis of rotation a direction corresponding to the direction in which the dial 8 of the dial-operated input device 7 has been rotated.

Movement of the Three-Dimensional Object 40

It is assumed here that "move" is set as the mode of manipulation of the three-dimensional object 40 in step S511. The dial-input conversion program monitors whether the dial-operated input device 7 is pushed in or rotated by the user. When the dial-input conversion program detects when the dial 8 of the dial-operated input device 7 has been pushed in once in step S512, it informs of the three-dimensional rendering program of a select command for switching of the movement axis for the three-dimensional object 40 between the vertical axis (z-axis in the three-dimensional space) and horizontal axis (y-axis in the three-dimensional space).

As shown in FIG. 7, when the three-dimensional rendering program has accepted the movement-axis select command from the dial-input conversion program, it will switch the movement axis of the three-dimensional object 40 between the vertical and horizontal axes. That is, in case the vertical axis has been defined as an initial axis of movement, the axis of movement is switched to the horizontal axis when a movement-axis select command takes place. When the movement-axis select command takes place again, the axis of movement is switched back to the vertical axis. Thus, the axis of movement is determined in step S513.

Thereafter, when the user rotates the dial 8 of the dial-operated input device 7 in step S514, the dial-input conversion program converts the detected direction and angle of the rotation of the dial 8 of the dial-operated input device 7 into values, respectively, of direction (upward, downward, leftward and rightward) and angle of rotation of the thee-dimensional object 40, and informs the data to the three-dimensional rendering program in step S515. The three-dimensional rendering program make a calculation for a movement of the three-dimensional object 40 on the basis of the values of direction and angle of rotation supplied from the dial-input conversion program in step S516. Thus, the three-dimensional object 40 having been rotated as intended by the user is displayed in step S501.

In FIG. 7, a reference number 71 indicates a relation between a direction of rotation of the dial 8 of the dial-operated input device 7 and direction of movement of the three-dimensional object 40 when the horizontal axis is selected as the axis of movement and 72 indicates a relation between a direction of rotation of the dial 8 of the dial-operated input device 7 and direction of movement of the three-dimensional object 40 when the vertical axis is selected as the axis of movement.

As shown in FIG. 7, when the dial 8 of the dial-operated input device 7 is rotated clockwise with the horizontal axis being selected as the axis of movement, the three-dimensional object 40 is moved over a distance corresponding to the angle of rotation of the dial 8 of the dial-operated input device 7 in the rightward direction (R). On the contrary, when the dial 8 of the dial-operated input device 7 is rotated counterclockwise, the three-dimensional object 40 is moved over a distance corresponding to the angle of rotation of the dial 8 of the dial-operated input device 7 in the leftward direction (L). When the dial 8 of the dial-operated input device 7 is rotated clockwise with the vertical axis being selected as the axis of movement, the three-dimensional object 40 is moved over a distance corresponding to the angle of rotation of the dial 8 of the dial-operated input device 7 in the upward direction (U). On the contrary, when the dial 8 of the dial-operated input device 7 is rotated counterclockwise, the three-dimensional object 40 is moved over a distance corresponding to the angle of rotation of the dial 8 of the dial-operated input device 7 in the downward direction (D).

Scale-Up/-Down of the Three-Dimensional Object 40

It is assumed here that "scale-up/-down" is set as the mode of manipulation of the three-dimensional object 40 in step S517. The dial-input conversion program monitors when the dial 8 of the dial-operated input device 7 has been pushed in or rotated clockwise or counterclockwise. When the dial-input conversion program detects when the user has rotated the dial 8 of the dial-operated input device 7 with the dial 8 being pushed in steps S518 and S519, it converts the direction and angle of rotation of the dial 8 of the dial-operated input device 7 into a scale-up and -down rate for the three-dimensional object 40 in step S520, and gives these data to the dial-input conversion program. The three-dimensional rendering program scales up or down the three-dimensional object 40 at the scale-up or -down rate from the dial-input conversion program in step S521. Thus, the three-dimensional object 40 scaled up or down as intended by the user is displayed in step S501.

In FIG. 8, a reference number 81 indicates a relation between a direction in which the dial 8 of the dial-operated input device 7 has been rotated and scale-down of the three-dimensional object 40, and 82 indicates a relation between a direction in which the dial 8 of the dial-operated input device 7 has been rotated and scale-up of the three-dimensional object 40. As shown in FIG. 8, when the dial 8 of the dial-operated input device 7 is rotated clockwise, the three-dimensional object 40 is scaled up at a rate corresponding to an angle through which the dial 8 of the dial-operated input device 7 has been rotated On the contrary, when the dial 8 of the dial-operated input device 7 is rotated counterclockwise, the three-dimensional object 40 is scaled down at a rate corresponding to an angle through which the dial 8 has been rotated.

According to the aforementioned first embodiment, the dial-operated input device 7 permits the user to easily rotate, move, scale up or down the three-dimensional object 40. Also, a combination of the push-in and rotation of the dial 8 of the dial-operated input device 7 will enable the user to select details of a manipulation of the three-dimensional object 40. Further, a combination of push-in and another operation, such as double push-in, and rotation of the dial 8 will make it possible to increase the kinds of possible manipulation of the three-dimensional object 40 limitlessly without having to modify the basic manner of operating the dial 8.

Next, the present invention will be illustrated described concerning the second embodiment thereof.

Figure 9:
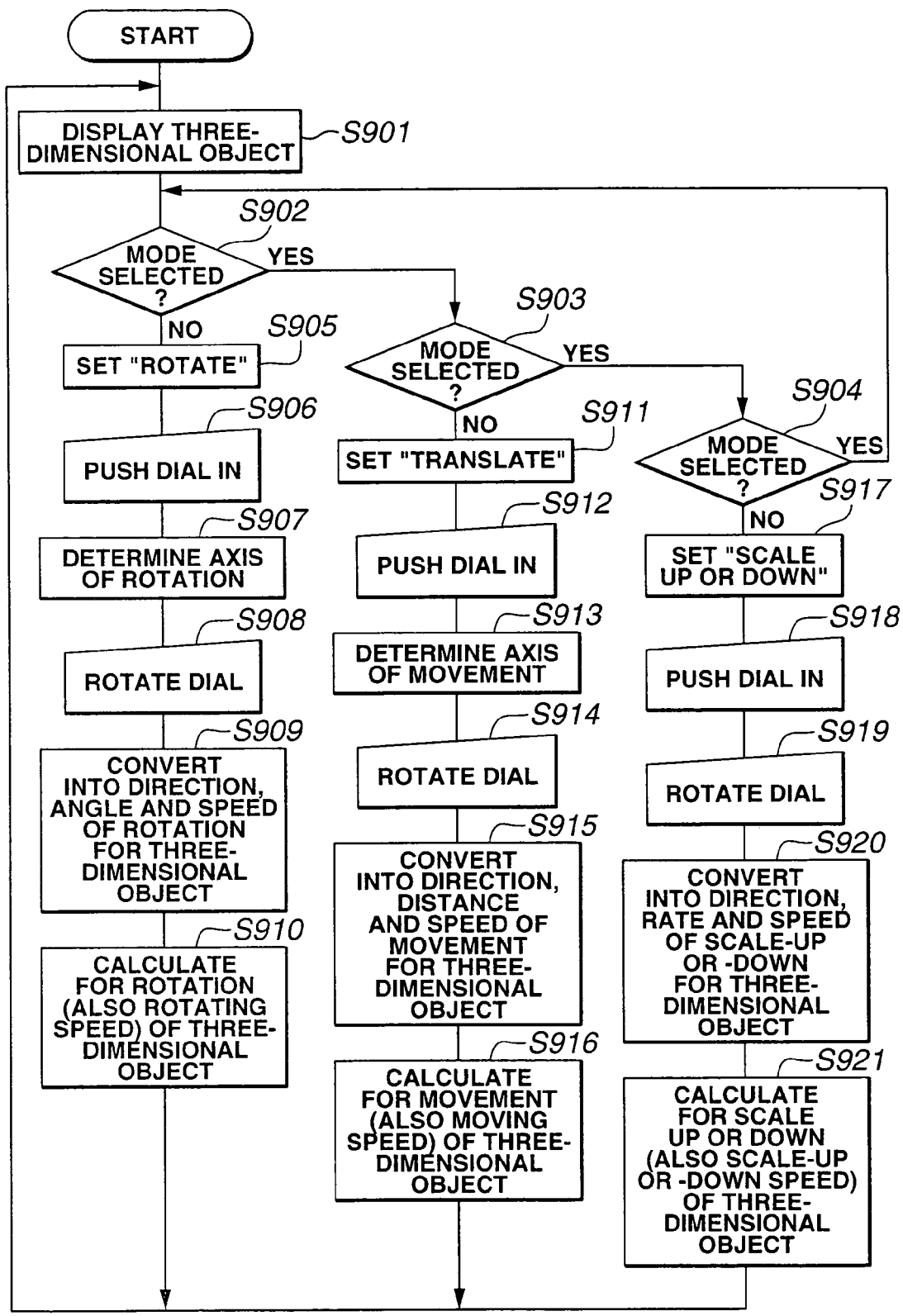
FIG. 9 shows a flow of operations made in manipulating a three-dimensional object by the dial-operated input device in a digital video camcorder as a second embodiment of the electronic appliance according to the present invention.

FIG. 9 shows a flow of operations made in manipulating a three-dimensional object with the use of the dial-operated input device 7.

In this flow chart, steps S901 to S907 are the same as steps S501 to S507 in the flow chart in FIG. 5 showing the flow of operations made in the first embodiment.

In the second embodiment, when the user selects the mode of rotation for the three-dimensional object 40 and rotates the dial 8 of the dial-operated input device 7 in step S908, the dial-input conversion program detects a direction, angle and speed of rotation of the dial 8 of the dial-operated input device 7, converts the direction, angle and speed of rotation into values, respectively, of a direction, angle and speed of rotating the three-dimensional object 40, and gives the values to the three-dimensional rendering program in step S909. That is, the second embodiment is different from the first embodiment in detection of a speed at which the dial 8 of the dial-operated input device 7 has been rotated and information of the detected speed of rotation to the three-dimensional rendering program.

The three-dimensional rendering program makes a calculation for rotation of the three-dimensional object 40 on the basis of the values of direction, angle and speed of rotation from the dial-input conversion program in step S910. Thus, the three-dimensional object 40 is rotated through a user-intended angle in a user-intended direction at a speed proportional to a speed at which the user rotates the dial 8 of the dial-operated input device 7 in step S901.

Also in this flow chart, steps S911 to S913 are the same as steps S511 to S513 in the flow chart in FIG. 5 showing the flow of operations made in the first embodiment.

When the user selects the mode of movement for the three-dimensional object 40 and rotates the dial 8 of the dial-operated input device 7 in step S914, the dial-input conversion program detects a direction, angle and speed of rotation of the dial 8 of the dial-operated input device 7, converts the direction, angle and speed of rotation into values, respectively, of a direction, angle and speed of moving the three-dimensional object 40, and gives the values to the three-dimensional rendering program in step S915.

The three-dimensional rendering program make a calculation for movement of the three-dimensional object 40 on the basis of the values of direction, angle and speed of movement from the dial-input conversion program in step S916. Thus, the three-dimensional object 40 is moved over a user-intended distance in a user-intended direction at a speed proportional to a speed at which the user rotates the dial 8 of the dial-operated input device 7 in step S901.

On the assumption that the number of times of the dial 8 of the dial-operated input device 7 has been rotated in a constant length of time is N and a coefficient for determination of a speed of rotation for the three-dimensional object 40 is $a$, the rotation speed $r$ (radian) of the three-dimensional object 40 is r=aN. Also, the system may be arranged such that the user can freely set the value of the coefficient $a$. Thus, the user will be able to rotate or move the three-dimensional object 40 more intuitively and easily.

Also in this flow chart, steps S917 and S918 are the same as steps S517 and S518 in the flow chart in FIG. 5 showing the flow of operations made in the first embodiment.

When the user selects the mode of scale-up or -down for the three-dimensional object 40 and rotates the dial 8 of the dial-operated input device 7 in step S919, the dial-input conversion program detects a direction, angle and speed of rotation of the dial 8 of the dial-operated input device 7, converts the direction, angle and speed of rotation into values, respectively, of a scale-up or -down direction, scale-up or -down rate (scale-up or -down extent) and scale-up or -down speed (scale-varying rate) for the three-dimensional object 40, and gives the values to the three-dimensional rendering program in step S920.

The three-dimensional rendering program make a calculation for scale-up or -down of the three-dimensional object 40 on the basis of the values of scale-up or -down, scale-up or -down rate (scale-up or -down extent) and scale-up or -down speed (scale-varying rate) from the dial-input conversion program in step S921. Thus, the three-dimensional object 40 is scaled up or down a user-intended scale-up or -down extent at a scale-varying rate proportional to a speed at which the user rotates the dial 8 of the dial-operated input device 7 in step S901.

The aforementioned embodiments of the present invention provide a digital video camcorder with which the user can easily manipulate the three-dimensional object 40.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The three-dimensional object manipulating system using the dial-operated input device according to the present invention is applicable to a digital video camcorder as well as to a portable electronic appliance such as a portable phone, PDA or the like and all electronic appliances, not portable.

According to the present invention having been described in the foregoing, the user can rotate a three-dimensional object through an arbitrary angle about an arbitrary axis of rotation by operating the dial-operated input device.

Also, the user can move a three-dimensional object over an arbitrary distance along an arbitrary axis of movement by operating the dial-operated input device.

Further, the user can intuitively resize a three-dimensional object at an arbitrary scale-up or -down rate.

What is claimed is:

1. A three-dimensional object manipulating apparatus, comprising:
   a display means for displaying a three-dimensional object on a screen of a display unit;
   a dial-operated input device including a dial which can be pushed in and rotated;
   a rotation-axis setting means for setting an axis of rotation for the three-dimensional object by pushing in the dial;
   a detection means for detecting a direction and an angle of rotation of the dial, the dial being movable between a first position and a second position, the first position locking the rotation of the dial and the second position unlocking the rotation of the dial; and
   an object rotating means for rotating the three-dimensional object displayed on the screen of the display unit about the axis of rotation set by the rotation-axis setting means based on the direction and the angle of rotation of the dial detected by the detection means.

2. The apparatus as set forth in claim 1, wherein the detection means detects a speed at which the dial of the dial-operated input device has been rotated, and
wherein the object rotating means rotates the three-dimensional object at the speed corresponding to the speed of rotation of the dial detected by the detection means.

3. A three-dimensional object manipulating apparatus, comprising:
a display means for displaying a three-dimensional object on a screen of a display unit;
a dial-operated input device including a dial which can be pushed in and rotated;
a moving-axis setting means for setting an axis of movement for the three-dimensional object by pushing in the dial;
a detection means for detecting a direction and an angle of rotation of the dial, the dial being movable between a first position and a second position, the first position locking the rotation of the dial and the second position unlocking the rotation of the dial; and
an object moving means for moving the three-dimensional object displayed on the screen of the display unit along the axis of movement set by the moving-axis setting means based on the direction and the angle of rotation of the dial detected by the detection means.

4. The apparatus as set forth in claim 3, wherein the detection means detects a speed at which the dial of the dial-operated input device has been rotated, and
wherein the object moving means moves the three-dimensional object at the speed corresponding to the speed of rotation of the dial detected by the detection means.

5. A three-dimensional object manipulating apparatus, comprising:
a display means for displaying a three-dimensional object on a screen of a display unit;
a dial-operated input device including a dial which can be pushed in and rotated;
a detection means for detecting a direction and an angle of rotation of the dial, the dial being movable between a first position and a second position, the first position locking the rotation of the dial and the second position unlocking the rotation of the dial; and
an object scale-up/scale-down means for scaling up or scaling down the three-dimensional object displayed on the screen of the display unit based on the direction and the angle of rotation of the dial detected by the detection means.

6. The apparatus as set forth in claim 5, wherein the detection means detects a speed at which the dial of the dial-operated input device has been rotated, and
wherein the object scale-up/scale-down means scales up or scales down the three-dimensional object displayed on the screen of the display unit at a scale-varying rate corresponding to the speed of rotation of the dial detected by the detection means.

7. A three-dimensional object manipulating method including a system comprising a display unit, a data processor, and a dial-operated input device having a dial which can be pushed in and rotated, the method comprising the steps of:
displaying a three-dimensional object on a screen of the display unit;
setting an axis of rotation for the three-dimensional object by pushing in the dial of the dial-operated input device;
detecting a direction and an angle of rotation of the dial, the dial being movable between a first position and a second position, the first position locking the rotation of the dial and the second position unlocking the rotation of the dial; and
rotating the three-dimensional object about the set axis of rotation based on the detected direction and angle of rotation of the dial.

8. The method as set forth in claim 7, further comprising:
detecting a speed at which the dial of the dial-operated input device has been rotated; and
rotating the three-dimensional object at the speed corresponding to the speed of rotation of the dial.

9. A three-dimensional object manipulating method including a system comprising a display unit, a data processor, and a dial-operated input device having a dial which can be pushed in and rotated, the method comprising the steps of:
displaying a three-dimensional object on a screen of the display unit;
setting an axis of movement for the three-dimensional object by pushing in the dial of the dial-operated input device;
detecting a direction and an angle of rotation of the dial, the dial being movable between a first position and a second position, the first position locking the rotation of the dial and the second position unlocking the rotation of the dial; and
moving the three-dimensional object along the set axis of movement based on the detected direction and angle of rotation of the dial.

10. The method as set forth in claim 9, further comprising:
detecting a speed at which the dial of the dial-operated input device has been rotated; and
moving the three-dimensional object displayed on the screen of the display unit at a speed corresponding to the detected speed of rotation of the dial.

11. A three-dimensional object manipulating method including a system comprising a display unit, a data processor, and a dial-operated input device having a dial which can be pushed in and rotated, the method comprising the steps of:
displaying a three-dimensional object on a screen of the display unit;
detecting a direction and an angle of rotation of the dial of the dial-operated input device, the dial being movable between a first position and a second position, the first position locking the rotation of the dial and the second position unlocking the rotation of the dial; and
scaling up or scaling down the three-dimensional object displayed on the screen of the display unit on the detected direction and angle of rotation of the dial.

12. The method as set forth in claim 11, further comprising:
detecting a speed at which the dial of the dial-operated input device has been rotated; and
scaling up or scaling down the three-dimensional object displayed on the screen of the display unit at a scale-varying rate corresponding to the speed of rotation of the dial.

13. A computer readable medium having a program for causing a system to execute a three-dimensional object manipulating method, the system comprising a display unit, a data processor, and a dial-operated input device having a dial which can be pushed in and rotated, the method comprising the steps of:
displaying a three-dimensional object on a screen of the display unit;

setting an axis of rotation for the three-dimensional object by pushing in the dial of the dial-operated input device;

detecting a direction and an angle of rotation of the dial, the dial being movable between a first position and a second position, the first position locking the rotation of the dial and the second position unlocking the rotation of the dial; and rotating the three-dimensional object about the set axis of rotation based on the detected direction and angle of rotation of the dial.

14. A computer readable medium having a program for causing a system to execute a three-dimensional object manipulating method, the system comprising a display unit, a data processor, and a dial-operated input device having a dial which can be pushed in and rotated, the method comprising the steps of:

displaying a three-dimensional object on a screen of the display unit;

setting an axis of movement for the three-dimensional object by pushing in the dial of the dial-operated input device;

detecting a direction and an angle of rotation of the dial, the dial being movable between a first position and a second position, the first position locking the rotation of the dial and the second position unlocking the rotation of the dial; and moving the three-dimensional object along the set axis of movement based on the detected direction and angle of rotation of the dial.

15. A computer readable medium having a program for causing a system to execute a three-dimensional object manipulating method, the system comprising a display unit, a data processor, and a dial-operated input device having a dial which can be pushed in and rotated, the method comprising the steps of:

displaying a three-dimensional object on a screen of the display unit; detecting a direction and an angle of rotation of the dial of the dial-operated input device, the dial being movable between a first position and a second position, the first position locking the rotation of the dial and the second position unlocking the rotation of the dial; and scaling up or scaling down the three-dimensional object displayed on the screen of the display unit based on the detected direction and angle of rotation of the dial.

* * * * *